United States Patent
Matsuno

(10) Patent No.: US 12,423,946 B2
(45) Date of Patent: Sep. 23, 2025

(54) METHOD, APPARATUS, AND PROGRAM FOR MATCHING POINT CLOUD DATA

(71) Applicant: TOYOTA JIDOSHA KABUSHIKI KAISHA, Toyota (JP)

(72) Inventor: Nobuyuki Matsuno, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 639 days.

(21) Appl. No.: 17/933,905

(22) Filed: Sep. 21, 2022

(65) Prior Publication Data
US 2023/0101689 A1    Mar. 30, 2023

(30) Foreign Application Priority Data
Sep. 22, 2021    (JP) ................. 2021-154215

(51) Int. Cl.
*G06K 9/00*    (2022.01)
*G06V 10/422*    (2022.01)
*G06V 10/75*    (2022.01)

(52) U.S. Cl.
CPC .......... *G06V 10/757* (2022.01); *G06V 10/422* (2022.01); *G06V 10/7515* (2022.01)

(58) Field of Classification Search
CPC . G06V 10/757; G06V 10/422; G06V 10/7515
See application file for complete search history.

(56) References Cited

U.S. PATENT DOCUMENTS

| | | | | |
|---|---|---|---|---|
| 12,307,738 | B2* | 5/2025 | Li | .................... G06T 17/00 |
| 2015/0009214 | A1* | 1/2015 | Lee | ................... G06T 17/10 |
| | | | | 345/420 |
| 2017/0344850 | A1* | 11/2017 | Kobori | .................... G06T 7/248 |
| 2018/0267538 | A1* | 9/2018 | Shum | ..................... B60W 30/09 |
| 2020/0082207 | A1* | 3/2020 | Xie | ........................ G01S 7/4802 |
| 2020/0103249 | A1* | 4/2020 | Zhou | ....................... G01S 17/86 |

(Continued)

FOREIGN PATENT DOCUMENTS

| | | |
|---|---|---|
| JP | 2019053597 A | 4/2019 |
| JP | 2019101885 A | 6/2019 |

(Continued)

OTHER PUBLICATIONS

NDT Scan Matching, Tier IV Academy, version 1.2, pp. 26-30.

(Continued)

*Primary Examiner* — Avinash Yentrapati
(74) *Attorney, Agent, or Firm* — Dickinson Wright, PLLC

(57) ABSTRACT

An apparatus for matching point cloud data according to an embodiment includes a generation unit configured to generate an input model and an input model group including a plurality of the input models, the input model being obtained by reducing a data amount of the point cloud data, an extraction unit configured to extract some of the input models from the input model group according to shape information of the input models, a calculation unit configured to compare an extracted extraction model with a reference model based on reference point cloud data and calculate a cost, a determination unit configured to determine whether or not the cost has converged, and a change unit configured to change a position and a posture so that the cost is reduced when the cost has not converged.

15 Claims, 9 Drawing Sheets

(56) References Cited

U.S. PATENT DOCUMENTS

| | | | | |
|---|---|---|---|---|
| 2023/0146134 A1* | 5/2023 | Selviah | ............... | G06V 20/653 345/419 |
| 2023/0237820 A1* | 7/2023 | Yakishyn | ............ | G06V 10/422 382/159 |

FOREIGN PATENT DOCUMENTS

| | | | |
|---|---|---|---|
| JP | 2020050337 A | | 4/2020 |
| WO | 2020085142 A1 | | 4/2020 |

OTHER PUBLICATIONS

Tier IV Tech Blog, Calculation of NDT Scan Matching Part 2; https://tech.tier4.jp/entry/2021/07/16/120000.

Tier IV Tech Blog, Calculation of NDT Scan Matching Part 1; https://tech.tier4.jp/entry/2021/05/06/160000.

Peter Biber et al., "The Normal Distributions Transform: A New Approach to Laser Scan Matching," WSI/GRIS University of Tubingen, Tubingen, Germany.

Naoki Akai et al, "Robust Localization Using 3D NDT Scan Matching with Experimentally Determined Uncertainty and Road Marker Matching," Conference Paper, Jun. 2017.

http://wiki.ros.org/perception_oru.

Todor Stoyanov et al., "Fast and accurate scan registration through minimization of the distance between compact 3D NDT representations," Pennsylvania State Univ, Feb. 19, 2016.

Jari Saarinen et al., "Normal Distributions Transform Monte-Carlo Localization (NDT-MCL)."

Jari Saarinen et al., "3D Normal Distributions Transform Occupancy Maps: An Efficient Representation for Mapping in Dynamic Environments."

Kenji Koide et al., "Voxelized GICP for Fast and Accurate 3D Point Cloud Registration."

Aleksandr V. Segal et al., "Generalized-ICP."

https://pointclouds.org/documentation/classpcl_1_1_normal_distributions_transform.html.

https://pointclouds.org/documentation/classpcl_1_1_generalized_iterative_closest_point.html.

* cited by examiner

METHOD, APPARATUS, AND PROGRAM FOR MATCHING POINT CLOUD DATA

CROSS REFERENCE TO RELATED APPLICATIONS

This application is based upon and claims the benefit of priority from Japanese patent application No. 2021-154215, filed on Sep. 22, 2021, the disclosure of which is incorporated herein in its entirety by reference.

BACKGROUND

The present disclosure relates to a method and an apparatus for matching point cloud data, and a program.

ICP (Iterative Closest Point) is used as a method for positioning point cloud data. The ICP is a method for calculating relative position and posture by adjusting position and posture of input point cloud so that the input point cloud matches reference point cloud. For example, the ICP is used for localization (i.e., self-localization) of an automobile. Point cloud data acquired from LiDAR (Light Detection And Ranging or Laser Imaging Detection And Ranging) installed in the automobile becomes an input point cloud. A map of a city is expressed by point clouds and is given as reference point cloud data.

Japanese Unexamined Patent Application Publication No. 2019-101885 discloses a technique for localization by means of NDT (Normal Distribution Transform). A modeling apparatus of Japanese Unexamined Patent Application Publication No. 2019-101885 applies voxel division to point cloud data and performs modeling for each voxel. After that, localization is performed by using modeled map point clouds and sensor point clouds. The data distribution of the voxel point clouds is expressed by an ellipsoid (FIG. 1). In addition, point clouds in sub-voxels, which are sub-divided voxels, are expressed by models.

SUMMARY

When point cloud data is matched in this manner, it is desired to perform processing at a higher speed and with higher accuracy.

The present disclosure has been made in order to solve such a problem, and provides a matching apparatus, a matching method, and a program capable of performing matching processing at a high speed and with high accuracy.

In an aspect of the embodiment, an apparatus for matching point cloud data includes: a generation unit configured to generate an input model and an input model group including a plurality of the input models, the input model being obtained by reducing a data amount of the point cloud data; an extraction unit configured to extract some of the input models from the input model group according to shape information of the input models; a calculation unit configured to compare an extracted extraction model with a reference model based on reference point cloud data and calculate a cost; a determination unit configured to determine whether or not the cost has converged; and a change unit configured to change a position and a posture so that the cost is reduced when the cost has not converged.

In the above apparatus, the extraction unit may determine the extraction model according to a direction of the input model.

In the above apparatus, the extraction unit is configured to determine the extraction model according to a distance between the input models.

In the above apparatus, the input model may be an ellipsoid model, and the ellipsoid model may be generated by grouping points included in a voxel.

In the above apparatus, the input model may be a planar model, and the planar model may be generated by grouping a plurality of points in the vicinity.

In another aspect of the embodiment, a method for matching point cloud data comprising: generating an input model and an input model group including a plurality of the input models, the input model being obtained by reducing a data amount of the point cloud data; extracting some of the input models from the input model group according to shape information of the input models included in the input model group; comparing an extracted extraction model with a reference model based on reference point cloud data and calculating a cost; determining whether or not the cost has converged; and changing a position and a posture so that the cost is reduced when the cost has not converged.

In the above method, the extraction model may be determined according to a direction of the input model.

In the above method, the extraction model may be determined according to a distance between the input models.

In the above method, the input model may be an ellipsoid model, and the ellipsoid model may be generated by grouping points included in a voxel.

In the above method, the input model may be a planar model, and the planar model may be generated by grouping a plurality of points in the vicinity.

In another example aspect, a program for causing a computer to execute a method for matching point cloud data including: generating an input model and an input model group including a plurality of the input models, the input model being obtained by reducing a data amount of the point cloud data; extracting some of the input models from the input model group according to shape information of the input models included in the input model group; comparing an extracted extraction model with a reference model based on reference point cloud data and calculating a cost; determining whether or not the cost has converged; and changing a position and a posture so that the cost is reduced when the cost has not converged.

In the above program, the extraction model may be determined according to a direction of the input model.

In the above method, the extraction model may be determined according to a distance between the input models.

In the above method, the input model may be an ellipsoid model, and the ellipsoid model may be generated by grouping points included in a voxel.

In the above matching method, the input model may be a planar model, and the planar model may be generated by grouping a plurality of points in the vicinity.

According to the present disclosure, it is possible to provide a matching apparatus, a matching method, and a program capable of performing matching processing at a high speed and with high accuracy.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be described through an embodiment of the disclosure, but the claimed disclosure is not limited to the following embodiment. Further, not all of the configurations described in the embodiment are essential as means for solving the problem.
(System Configuration)

Figure 1:
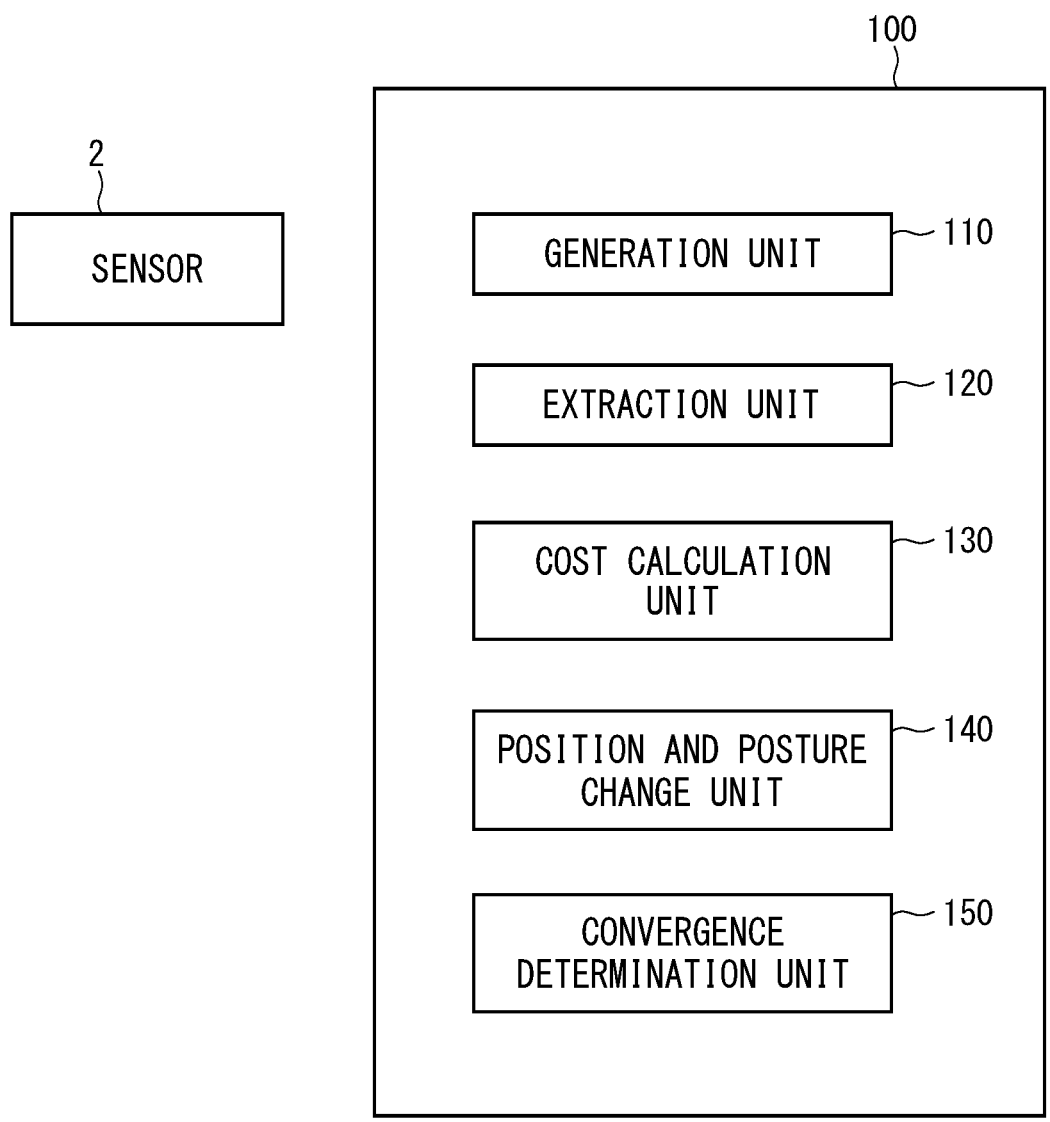
FIG. 1 is a block diagram schematically showing an apparatus for matching point cloud data.

FIG. 1 is a block diagram showing a configuration of a matching apparatus 100 and a system 1 thereof according to the embodiment. The system 1 includes a sensor 2 and the matching apparatus 100. The matching apparatus 100 includes a generation unit 110, an extraction unit 120, a cost calculation unit 130, a position and posture change unit 140, and a convergence determination unit 150.

The sensor 2 is, for example, a distance measuring sensor of a LiDAR. The sensor 2 measures a distance to a peripheral object and a peripheral person (hereinafter, they are collectively referred to as peripheral objects). Specifically, the sensor 2 includes a laser light source for generating a laser beam and a photodetector for detecting the laser beam reflected by a peripheral object. The sensor 2 measures a 15 distance to the peripheral object based on a round-trip time until the laser beam is reflected by the peripheral object and returned to the sensor 2.

The sensor 2 further includes a scanning optical system for scanning the laser beam, a mechanism for rotating an optical module, and so on. Point cloud data can be acquired by the sensor 2 changing an emission direction of the laser beam. Each point of the point cloud data indicates a distance from the sensor 2 to the peripheral object. That is, the sensor 2 measures the distance to the peripheral object for each direction to measure the point cloud data. The sensor 2 outputs the point cloud data to the matching apparatus 100. Each point of the point cloud data has information about three-dimensional coordinates. That is, the coordinates of each point are shown in a three-dimensional rectangular coordinate system or a polar coordinate system. Note that the sensor 2 is not limited to a lidar and may be any sensor as long as it can acquire the point cloud data.

The matching apparatus 100 acquires the point cloud data acquired by the sensor 2 and records it in a memory or the like. The point cloud data input to the matching apparatus 100 is also referred to as an input point cloud. The matching apparatus 100 uses the GICP (Generalized Iterative Closest Point) algorithm, NDT (Normal Distribution Transform), or the like to find position and posture in which an input model obtained by abstracting the input point cloud matches a reference model obtained by abstracting reference point cloud. In the following description, an example of using the NDT for abstracting the point cloud data by an ellipsoid model will be described.

The generation unit 110 generates an input model by reducing the number of data pieces of the input point cloud data and generates an input model group including a plurality of the input models. An amount of data processing can be reduced by using the input model representing the point clouds. Therefore, high-speed processing is possible. Here, the input model is an ellipsoid model. The input model group includes two or more ellipsoid models which are hereinafter also referred to as input ellipsoids. The generation unit 110 generates the input ellipsoid by modeling a plurality of points. The generation unit 110 generates the input ellipsoid by abstracting the input point cloud.

For example, the generation unit 110 divides a sensing space into a plurality of voxels. For example, the generation unit 110 divides a space by using a three-dimensional space of 1 m cubic as one voxel. The generation unit 110 generates one ellipsoid model by using the input point clouds included in one voxel as one group (one point set). The generation unit 110 approximates the input ellipsoid by the input point clouds included in each voxel. The input ellipsoid is an input model representing the input point clouds included in the voxel. The input point clouds included in one voxel are expressed by one input ellipsoid.

The generation unit 110 performs a principal component analysis on the grouped input point clouds to convert the point clouds into an ellipsoid. The generation unit 110 generates the input ellipsoid composed of three main axes by using the principal component analysis. For example, axial directions of a first principal component to a third principal component correspond to the axes of the ellipsoid, respectively. The first principal component having a largest variation corresponds to a long axis of the input ellipsoid. The generation unit 110 generates the input ellipsoid for each voxel. That is, one input ellipsoid is generated from one voxel. A plurality of the input ellipsoids generated by the generation unit 110 constitute the input model group.

The input ellipsoid is a spheroid (a prolate spheroid) obtained by rotating an axis of an ellipse. The ellipsoid may be a spheroid obtained by rotating an ellipse about its major axis, or a spheroid (an oblate spheroid) obtained by rotating an ellipse about its minor axis. As described above, the input point cloud is expressed by the input ellipsoid. That is, shape information indicating a shape of the input ellipsoid changes according to the three-dimensional coordinates of the input point cloud.

The extraction unit 120 extracts some of the input models from the input model group. That is, by decimating the input ellipsoids included in the input model group, the extraction unit 120 extracts some of the input ellipsoids. The input ellipsoid extracted by the extraction unit 120 is referred to as an extraction ellipsoid (or an extraction model).

Figure 2:
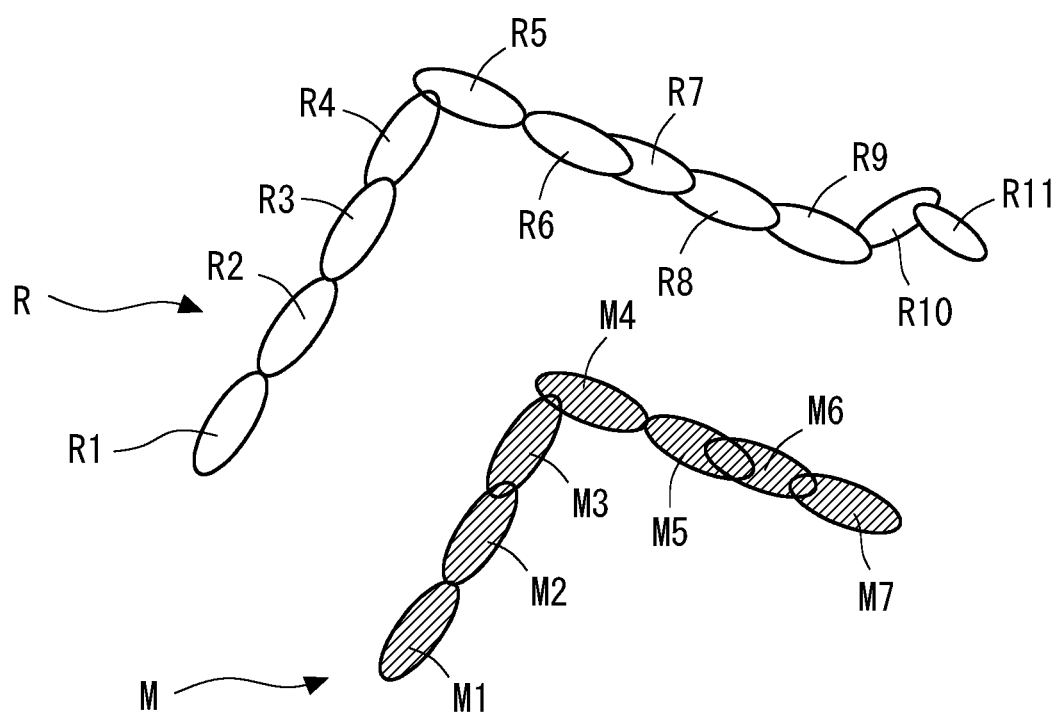
FIG. 2 is a schematic diagram showing an input model group M and a reference model group R in a plan view.

FIG. 2 is a schematic diagram showing an input model group M and a reference model group R. FIG. 2 shows an input ellipsoid group generated as an input model group M. Specifically, the input model group M includes seven input ellipsoids M1 to M7. The reference model group R includes eleven reference ellipsoids R1 to R11. Here, the input ellipsoids M1 to M7 and the reference ellipsoids R1 to R11 are shown in a plan view. That is, the input ellipsoids M1 to M7 and the reference ellipsoids R1 to R11 are shown as ellipses.

The reference model group is generated based on reference point cloud data such as map information. That is, the reference point cloud data is divided into voxels, and a principal component analysis is carried out on reference point clouds included in each voxel, so that a reference model group is obtained. For example, the reference point cloud data and the reference model group are previously stored in a memory or the like.

Figure 3:
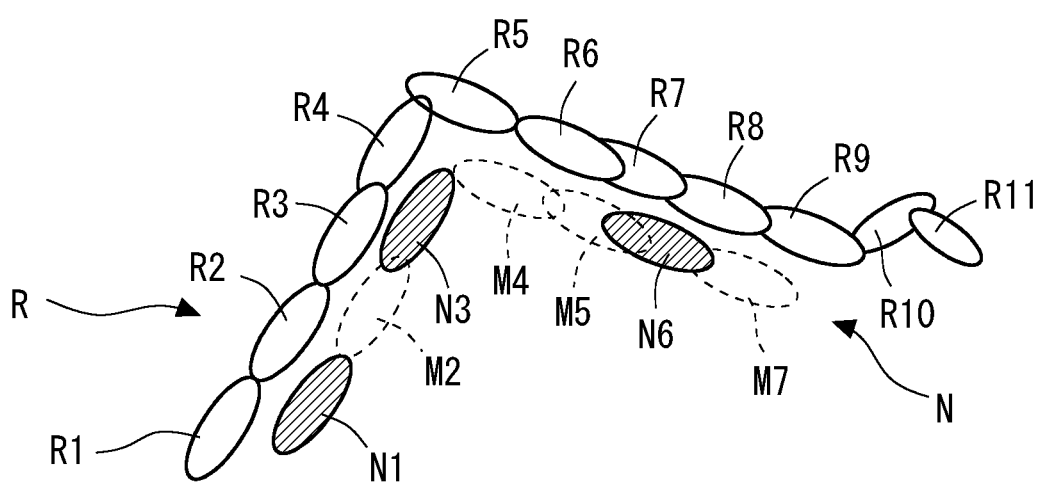
FIG. 3 is a schematic diagram showing an extraction model group N and the reference model group R in a plan view.

FIG. 3 is a schematic diagram showing extraction models extracted by the extraction unit 120. Here, the extraction unit 120 extracts three input ellipsoids M1, M3, and M6 from the seven input ellipsoids M1 to M7 shown in FIG. 2 as the extraction models (which are shown as extraction ellipsoids N1, N3, and N6 in FIG. 3.). That is, the extraction unit 120 thins out the input ellipsoids M2, M4, M5, and M7. The model group composed of the extraction ellipsoids N1, N3 and N6 is referred to as an extraction model group N.

The cost calculation unit 130 compares the extraction model group N with the reference model group R to calculate a cost. For example, the cost calculation unit 130 searches for the reference ellipsoid (hereinafter also referred to as a target reference ellipsoid) nearest to each of the extracted ellipsoids N1, N3, and N6. The target reference ellipsoid is a reference ellipsoid nearest to the extraction ellipsoid among the reference ellipsoids included in the reference model group. Therefore, one target reference ellipsoid is specified for one extraction ellipsoid. For example, in FIG. 4, the reference ellipsoid R2 nearest to the extracted ellipsoid N1 is the target reference ellipsoid of the extraction ellipsoid N1.

The cost calculation unit 130 calculates a distance between the extraction ellipsoid and the target reference ellipsoid as a cost. That is, the cost calculation unit 130 compares the extraction ellipsoid with the target reference ellipsoid, and calculates a cost corresponding to the distance between the two ellipsoids. The distance between the two ellipsoids is not only a linear distance but also a distance in consideration of the shape of the ellipsoid. For example, the cost calculation unit 130 can calculate the distance between ellipsoids from a feature amount vector indicating features of the ellipsoids. The cost between the extraction ellipsoid facing a direction different from a direction in which the target reference ellipsoid faces becomes large. On the other hand, the cost between the extraction ellipsoid facing the same direction as that of the target reference ellipsoid becomes small. The cost calculation unit 130 calculates a distance between ellipsoids for each extraction ellipsoid and adds the distance to obtain the cost.

In the example shown in FIG. 3, for each of the extraction ellipsoids N1, N3, and N6, the cost calculation unit 130 calculates the distance to the nearest target reference ellipsoid. Thus, three distances are calculated. The cost calculation unit 130 calculates the cost of the extraction model group N and the reference model group R by adding the three distances. The cost calculation unit 130 may calculate the cost based on the Euclidean distance between ellipsoids, the norm, etc. Alternatively, the cost calculation unit 130 may calculate the cost based on the distance between feature amount vectors indicating features of ellipsoids.

The position and posture change unit 140 changes relative positions and postures of the reference model group R and the extraction model group N. For example, when the coordinates are expressed in a three-dimensional rectangular coordinate system, the position and posture change unit 140 changes a translation position along the three-axis direction and a rotation position (posture) around the three axes of the extraction model group N. Alternatively, the position and posture change unit 140 may change a translation position along the three axes and a rotation position (posture) around the three axes of the reference model group R.

Every time the position and posture change unit 140 changes the position and posture, the cost calculation unit 130 calculates the cost. That is, the cost calculation unit 130 calculates the cost for each iteration. The cost calculation unit 130 calculates the costs before and after the position and posture are changed. The position and posture change unit 140 changes the position and posture so that the cost is reduced. For example, the position and posture change unit 140 uses an optimization technique such as a gradient method to change a position and posture estimated value so that the cost is reduced. The matching apparatus 100 repeats the cost calculation performed by the cost calculation unit 130 and change of the position and posture performed by the position and posture change unit 140.

The convergence determination unit 150 determines whether or not the cost has converged. That is, the matching apparatus 100 repeatedly performs the cost calculation and the change of the position and posture until the cost converges. For example, the convergence determination unit 150 compares the costs before and after the position and posture are changed, and makes a determination as to whether the cost has converged. The convergence determination unit 150 performs iterative calculation until the difference between the cost before the position and posture are changed and the cost after the position and posture are changed becomes less than or equal to a predetermined threshold. Alternatively, the convergence determination unit 150 repeats the change of the position and posture and the cost calculation until a predetermined number of iterations is reached.

The matching apparatus 100 matches the reference model group R with the extraction model group N by the iterative calculation. The matching apparatus 100 sets the position and posture in which the reference model group R has matched the extraction model group N as a matching position and posture between the input point cloud (the input model group M) and the reference point cloud (the reference model group R).

Figure 4:
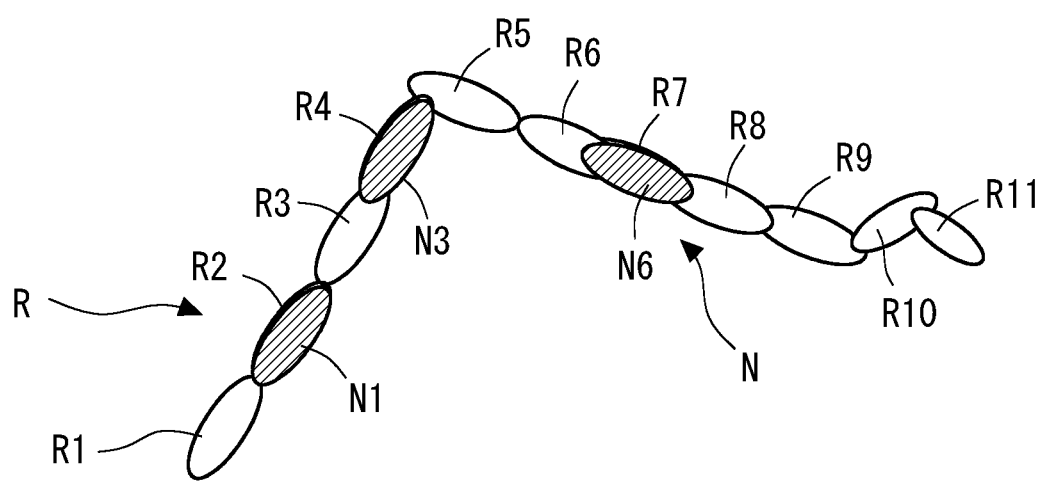
FIG. 4 is a schematic diagram showing an extracted ellipsoid and a reference ellipsoid in a plan view when costs converge.

FIG. 4 is a schematic diagram showing the reference model group R and the extraction model group N in a plan view when the costs converge. The cost between the extraction model group N and the reference model group R are minimized by the iteration of the cost calculation and change of the position and posture. The position and posture in which the cost becomes a minimum value (or a minimal value) is the matching position and posture, respectively. Specifically, the position and posture of the extraction ellipsoid N1 almost match the position and posture of the target reference ellipsoid R2. The position and posture of the extraction ellipsoid N3 almost match the position and posture of the target reference ellipsoid R4, respectively, and the position and posture of the extracted ellipsoid N6 almost match the position and posture of the target reference ellipsoid R7, respectively.

In this way, the cost is calculated for each iteration. The cost calculation unit 130 calculates the cost by calculating the distance for each ellipsoid. Therefore, the extraction unit 120 extracts some of the input ellipsoids from the input model group M as the extraction ellipsoids, thereby reducing the calculation load. That is, since the number of models can be reduced, the calculation amount can be reduced. Further, the matching of the point cloud data can be performed accurately. Furthermore, the matching processing can be performed at a high speed and with high accuracy.

Additionally, the extraction unit 120 extracts the input ellipsoid according to the shape information indicating a shape of the input ellipsoid, and the like. The shape information is information indicating the shape, position, and posture (the axial direction) of the input model, and is information specific to each input ellipsoid. For example, the feature amount obtained from the grouped point clouds may be the shape information.

For example, the extraction unit 120 selects the extracted ellipsoid according to the orientation and position indicated by the shape information of the input ellipsoid. For example, the extraction unit 120 extracts the extraction ellipsoid so as to thin out the input ellipsoid positioned adjacent to another input ellipsoid. The extraction unit 120 extracts the extraction ellipsoid so as to thin out an input ellipsoid oriented to face a direction similar to that of the extraction ellipsoid. Thus, the cost can be calculated more appropriately. This point will be described with reference to FIG. 5.

Figure 5:
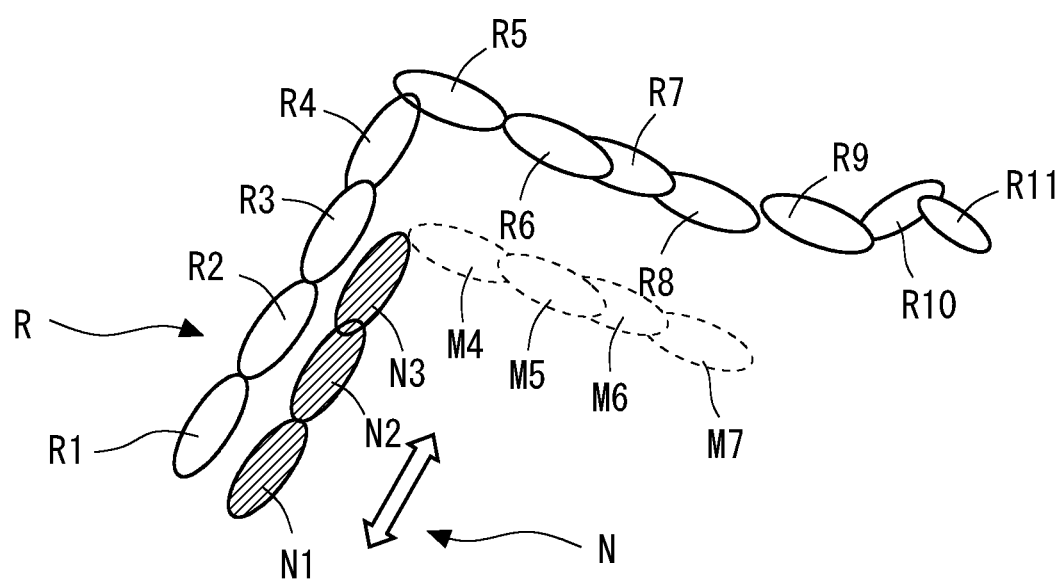
FIG. 5 is a schematic diagram for explaining processing when extraction ellipsoids close to each other and having similar directions are extracted.

FIG. 5 is a schematic diagram showing an example of extracting input ellipsoids which are located adjacent to each other and oriented so as to face the same direction. Specifically, the extraction unit 120 extracts the input ellipsoids M1, M2, and M3 shown in FIG. 2 as the extraction ellipsoids N1, N2, and N3, respectively. That is, the extraction unit 120 thins out the input ellipsoids M4 to M7 of FIG. 2. The extraction ellipsoids N1, N2, and N3 are oriented so as to face substantially the same direction and are arranged adjacent to each other.

In this case, it becomes difficult for the matching apparatus 100 to determine an appropriate matching position between the extraction model group N and the reference model group R. For example, in FIG. 5, the reference ellipsoids R1, R2, and R3 are regarded as target reference ellipsoids disposed nearest to the extracted ellipsoids N1, N2, and N3, respectively. That is, the cost is minimized in a position and posture other than the matching position and posture shown in FIG. 5. Since the matching apparatus 100 cannot obtain appropriate matching position and posture, the matching position and posture of the point cloud data are calculated incorrectly.

Therefore, as shown in FIG. 4, it is preferable that the extraction unit 120 extracts input ellipsoids oriented so as to face different directions. That is, the extraction unit 120 thins out an input ellipsoid oriented to face a direction close to that of the extraction ellipsoid. The orientation of the input ellipsoid can be determined by the axial direction of the first principal component or the like. Further, the extraction unit 120 extracts an input ellipsoid located away from another input ellipsoid. That is, the extraction unit 120 thins out an input ellipsoid adjacent to the selected extraction ellipsoid. The extraction unit 120 thins out the input ellipsoid located close to another input ellipsoid. For example, the distance between the input ellipsoids may be the Euclidean distance of the center of gravity or the center of the input ellipsoids. In this way, an extraction ellipsoid suitable for matching can be extracted. It is thus possible to achieve high-speed processing and high matching accuracy.

Further, the extraction unit 120 may select an input ellipsoid having an elongated rod-like shape or an input ellipsoid having a flat shape like a disk, and extract it as an extraction ellipsoid. On the other hand, an input ellipsoid that is nearly spherical has no information about the orientation and is therefore of low value. For this reason, the extraction unit 120 eliminates an input ellipsoid that is nearly spherical.

The extraction unit 120 selects an input ellipsoid of higher value according to the shape information of each input ellipsoid to use it as an extraction ellipsoid. For an input ellipsoid that is nearly spherical, the change in the cost is small even if the orientation of the input ellipsoid is changed. Therefore, even when the position and posture change unit 140 changes relative orientations of the reference model group R and the extraction model group N, the change in the cost becomes small. Therefore, there is a possibility that the cost calculation converges in incorrect position and posture.

Therefore, in this embodiment, the extraction unit 120 eliminates the input ellipsoid that is nearly spherical, so that the convergence determination unit 150 can appropriately determine whether the cost has converged. In this manner, the extraction unit 120 can extract the input ellipsoid according to the shape information indicating the shape of the input ellipsoid. The matching apparatus 100 can calculate appropriate matching position and posture. The shape information is a feature amount indicating a feature of the point set.

Figure 6:
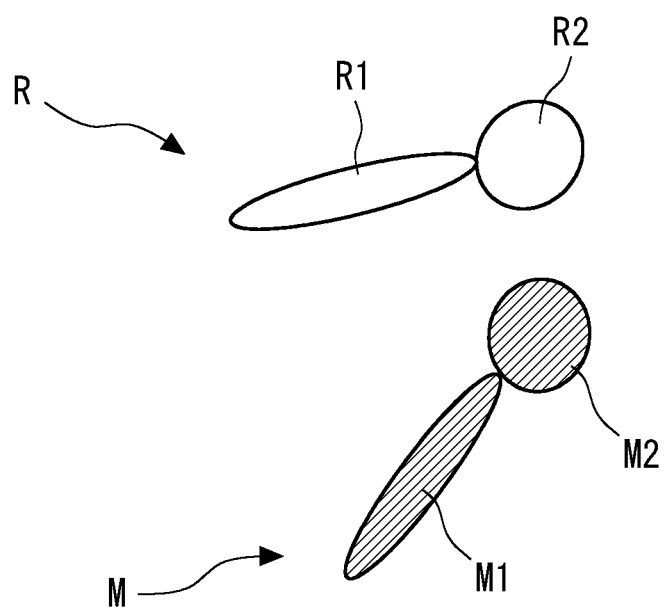
FIG. 6 is a schematic diagram showing the input model group M and the reference model group R in a plan view.

FIG. 6 is a plan view schematically showing the reference model group R and the input model group M. The reference model group R includes reference ellipsoids R1 and R2. The input model group M includes input ellipsoids M1 and M2. Here, the reference ellipsoid R1 has a shape closer to a spherical shape than the reference ellipsoid R2 does. The input ellipsoid M1 has a shape closer to a spherical shape than the input ellipsoid M2 does.

Figure 7:
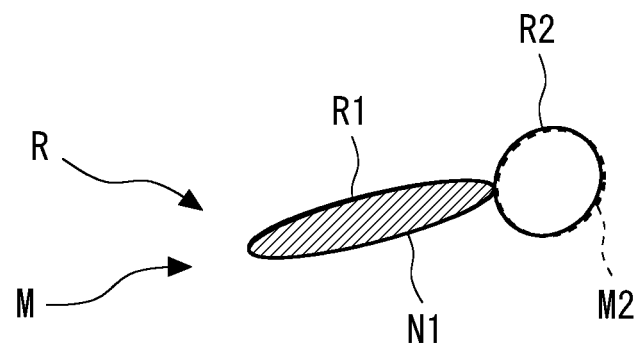
FIG. 7 is a diagram for explaining processing when an elongated rod-shaped input ellipsoid is extracted.

FIG. 7 is a schematic diagram showing the matching position and posture when the input ellipsoid M1 is extracted as the extraction ellipsoid N1. That is, in FIG. 7, the extraction unit 120 thins out the input ellipsoid M2 which is nearly spherical. When the elongated extraction ellipsoid N1 is extracted, the input model group M and the reference model group R are appropriately matched. That is, in the matched position and posture, the displacement of the positions and postures of the input ellipsoids M1 and M2 from the positions and postures of the reference ellipsoids R1 and R2, respectively, is reduced.

Figure 8:
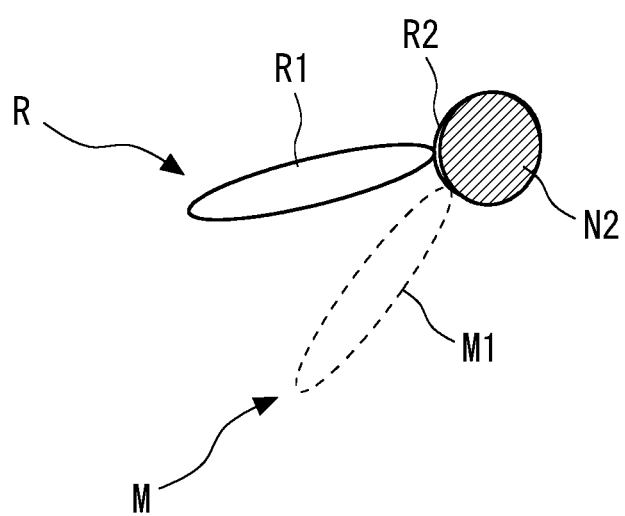
FIG. 8 is a diagram for explaining processing when a nearly spherical input ellipsoid is extracted.

FIG. 8 is a schematic diagram showing the matching position and posture when the input ellipsoid M2 is extracted as the extraction ellipsoid N2. Specifically, in FIG. 8, the extraction unit 120 thins out the input ellipsoid M1 which has an elongated rod-like shape. If the extracted ellipsoid N2 that is close to a spherical shape (it is circular in FIG. 8, because it is shown in a plan view) is extracted, there is a possibility that appropriate matching position and posture may not be calculated.

In FIG. 8, the cost calculation converges in a state where a difference between the orientation of the input model group M and that of the reference model group R is large. In other words, in FIG. 8, the position and posture of the extracted ellipsoid N2 are substantially identical to the position and posture of the reference ellipsoid R2, respectively, but the position and posture of the thinned-out input ellipsoid M1 are largely different from the position and posture of the reference ellipsoid R1, respectively. Therefore, the matching apparatus 100 cannot calculate appropriate matching position and posture.

In this manner, the extraction unit 120 selects the extraction model to be extracted according to the shape, position, orientation, etc. Thus, the matching position and posture can be appropriately calculated. Furthermore, since the number of extraction models can be further reduced, the calculation load can be further reduced.

Figure 9:
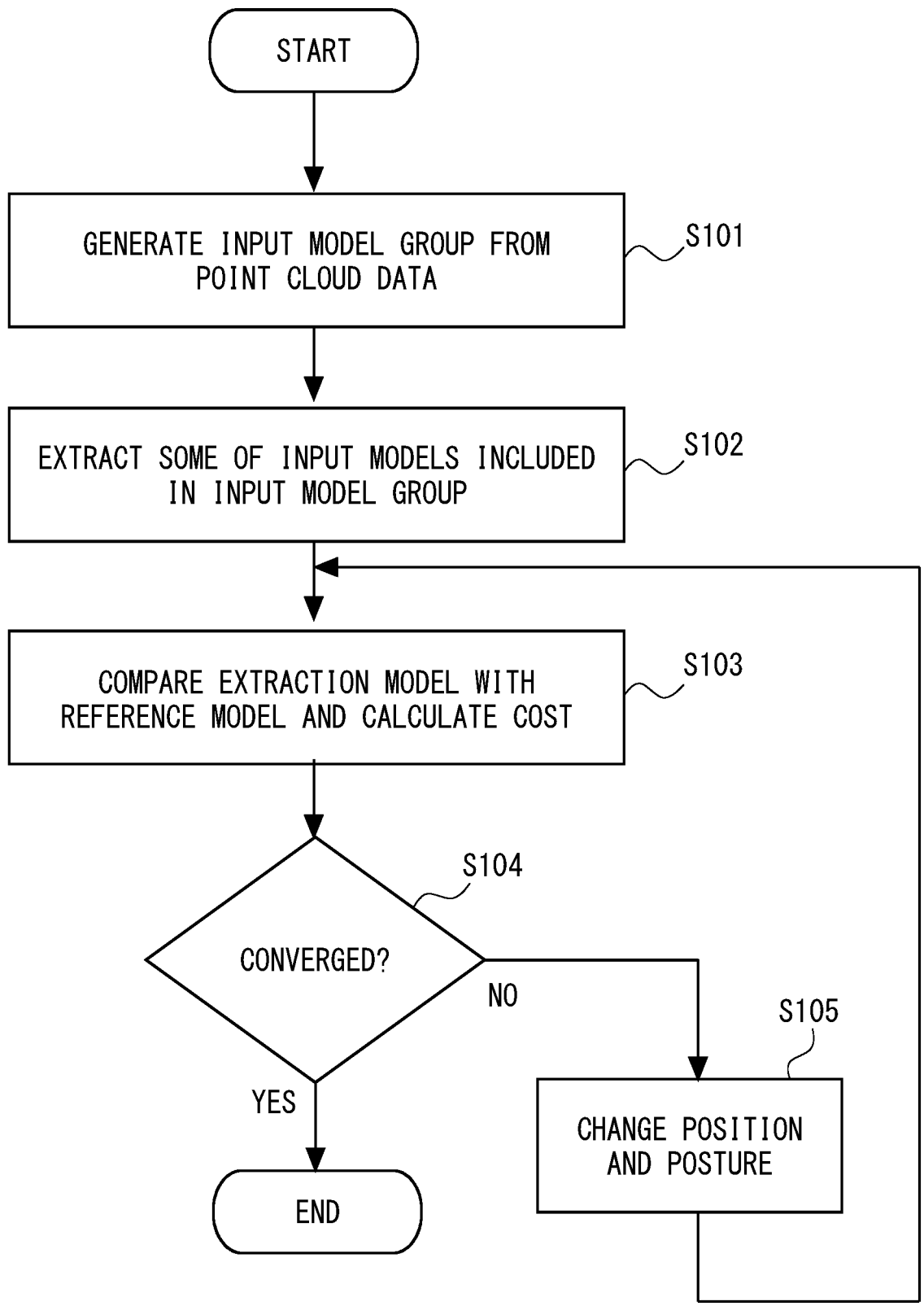
FIG. 9 is a flowchart showing a method for matching point cloud data according to this embodiment.

A method for matching the point cloud data (a method for registering the point cloud data) according to this embodiment will be described below with reference to FIG. 9. FIG. 9 is a flowchart showing a matching method.

First, the generation unit 110 generates the input model group from the point cloud data (S101). That is, a measurement space is divided into a plurality of voxels, and an input model is generated from the point cloud data included in the voxels. The input model may be, for example, an ellipsoid model. An input model group is generated by the generation unit 110 calculating an input ellipsoid for each voxel.

Next, the extraction unit 120 extracts some of input models included in the input model group (S102). For example, the extraction unit 120 extracts an input model based on the shape information unique to each input model. That is, the extraction unit 120 extracts the input model based on the shape, position, posture, eigenvalue, normal vector, or the like of the input model. The input model extracted by the extraction unit 120 becomes an extraction model.

The cost calculation unit 130 compares the extraction model with the reference model and calculates the cost of the extraction model group (S103). Here, the cost calculation unit 130 searches for the nearest reference model for each extraction model and calculates the distance between the models. The distance is the cost that varies according to the posture and shape of the model. The cost between the reference model group and the extraction model group is calculated by adding up the cost for each extraction model.

The convergence determination unit 150 determines whether or not the iteration of the cost calculation has converged (Step S104). If the iteration has not converged (NO in S104), the position and posture change unit 140 changes the position and posture of the extraction model group (S105). Then, the cost calculation unit 130 calculates the cost again based on the changed position and posture.

If the iteration converges (YES in Step S104), the matching processing ends. For example, when the number of iterations reaches a predetermined value, the convergence determination unit 150 determines that the convergence is achieved. Alternatively, when the change in the cost converges, the convergence determination unit 150 determines that the convergence is achieved. In this way, it is possible to obtain appropriate matching position and posture by high-speed processing.

In the above embodiment, the ellipsoid model is generated as the input model and the reference model, but the input model and the reference model are not limited to the ellipsoid model. The input model may be any model that can compress the data amount of the point cloud data. For example, the input model and the reference model may be other models such as planar models. The reference model is the same model as the input model.

In the case of GICP, the generation unit 110 generates the planar model by using a plurality of points in the vicinity as a grouped point set. The generation unit 110 performs a principal component analysis on a predetermined number of point cloud data pieces. For example, the generation unit 110 calculates an eigenvalue by solving an eigenvalue problem of a variance-covariance matrix or a correlation matrix. The generation unit 110 calculates a principal axis having the smallest eigenvalue, and thus generates a plane having a normal parallel to the principal axis. The plane with the smallest sum of squared distances from each point is the planar model. In other words, the input model is a plane whose normal direction is the direction in which the variation is the smallest (the third principal component vector). The planar model is a plane that passes through the center of gravity of the point set. The planar model is a plane including a first principal component axis and a second principal component axis. Here, the generation unit 110 generates a planar model from a set of 20 points by using 20 neighboring points as a set (one point set).

When the planar model is used as the input model, the extraction unit 120 may thin out a non-planar planar model. That is, if the eigenvalue corresponding to the principal axis indicating the normal is greater than or equal to a predetermined value, the planar model is not planar, and thus the extraction unit 120 thins out the planar model. On the other hand, if the eigenvalue corresponding to the principal axis indicating the normal is less than the predetermined value, the planar model is planar, and thus the extraction unit 120 extracts the planar model. The generation unit 110 may include the eigenvalue in the shape information. Alternatively, the extraction unit 120 extracts the planar model according to the sum of the square distances from the point cloud to the plane. The extraction unit 120 can extract the planar model according to the shape information of the planar model. The shape information of the planar model is obtained from the feature amount which represents the point set. In other words, the extraction unit 120 can extract the planar model based on the feature amount obtained from the point set.

It is obvious that the extraction unit 120 can extract the extraction model based on the shape information specific to each planar model. In this case, the shape information may include information indicating the center of gravity position of the grouped point clouds. Then, the extraction unit 120 thins out a planar model whose center of gravity position is close to that of another planar model. Alternatively, the shape information may include information indicating the normal direction of the planar model. The extraction unit 120 may thin out a planar model whose normal direction is nearly parallel to that of another planar model.

The above matching method can be implemented by a computer program or hardware. The matching apparatus 100 includes a memory for storing the program, a processor for executing the program, and the like. When the matching apparatus 100 executes the program, the matching method according to this embodiment can be executed.

A part of or all of the above processing may be performed by the computer program. That is, when a control computer constituting the matching apparatus 100 executes the program, the matching apparatus 100 is controlled. The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Although the disclosure made by the inventor of the present disclosure has been described in detail based on the embodiments described above, the present disclosure is not limited to the embodiments described above, and it is needless to say that various modifications can be made without departing from the gist thereof.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An apparatus for matching point cloud data comprising:
   a generation unit configured to generate an input model and an input model group including a plurality of the input models, the input model being obtained by reducing a data amount of the point cloud data;
   an extraction unit configured to extract some of the input models from the input model group according to shape information of the input models;
   a calculation unit configured to compare an extracted extraction model with a reference model based on reference point cloud data and calculate a cost;
   a determination unit configured to determine whether or not the cost has converged; and
   a change unit configured to change a position and a posture so that the cost is reduced when the cost has not converged.

2. The apparatus for matching point cloud data according to claim 1, wherein
   the extraction unit is configured to determine the extraction model according to a direction of the input model.

3. The apparatus for matching point cloud data according to claim 1, wherein
   the extraction unit is configured to determine the extraction model according to a distance between the input models.

4. The apparatus for matching point cloud data according to claim 1, wherein
   the input model is an ellipsoid model, and
   the ellipsoid model is generated by grouping points included in a voxel.

5. The apparatus for matching point cloud data according to claim 1, wherein
   the input model is a planar model; and
   the planar model is generated by grouping a plurality of points in the vicinity.

6. A method for matching point cloud data comprising:
   generating an input model and an input model group including a plurality of the input models, the input model being obtained by reducing a data amount of the point cloud data;
   extracting some of the input models from the input model group according to shape information of the input models included in the input model group;
   comparing an extracted extraction model with a reference model based on reference point cloud data and calculating a cost;
   determining whether or not the cost has converged; and
   changing a position and a posture so that the cost is reduced when the cost has not converged.

7. The method for matching point cloud data according to claim 6, wherein
   the extraction model is determined according to a direction of the input model.

8. The method for matching point cloud data according to claim 6, wherein
   the extraction model is determined according to a distance between the input models.

9. The method for matching point cloud data according to claim 6, wherein
   the input model is an ellipsoid model, and
   the ellipsoid model is generated by grouping points included in a voxel.

10. The method for matching point cloud data according to claim 6, wherein
    the input model is a planar model; and
    the planar model is generated by grouping a plurality of points in the vicinity.

11. A non-transitory computer readable medium storing a program for causing a computer to execute a method for matching point cloud data comprising:
    generating an input model and an input model group including a plurality of the input models, the input model being obtained by reducing a data amount of the point cloud data;
    extracting some of the input models from the input model group according to shape information of the input models included in the input model group;
    comparing an extracted extraction model with a reference model based on reference point cloud data and calculating a cost;
    determining whether or not the cost has converged; and
    changing a position and a posture so that the cost is reduced when the cost has not converged.

12. The non-transitory computer model according to claim 11,
    wherein the extraction model is determined according to a direction of the input model.

13. The non-transitory computer readable medium according to claim 11, wherein
    the extraction model is determined according to a distance between the input models.

14. The non-transitory computer readable medium according to claim 11, wherein
    the input model is an ellipsoid model, and
    the ellipsoid model is generated by grouping points included in a voxel.

15. The non-transitory computer readable medium according to claim 11, wherein
    the input model is a planar model; and
    the planar model is generated by grouping a plurality of points in the vicinity.

* * * * *